United States Patent
Estabrook et al.

(10) Patent No.: US 8,180,503 B2
(45) Date of Patent: May 15, 2012

(54) ASSISTED FLIGHT COMPUTER PROGRAM AND METHOD

(75) Inventors: John T. Estabrook, Corvallis, OR (US); Mitchell S. Trope, Lawrence, KS (US); Thomas J. Carr, Overland Park, KS (US)

(73) Assignee: Garmin International, Inc., Olathe, KS (US)

( * ) Notice: Subject to any disclaimer, the term of this patent is extended or adjusted under 35 U.S.C. 154(b) by 1255 days.

(21) Appl. No.: 11/463,179

(22) Filed: Aug. 8, 2006

(65) Prior Publication Data

US 2008/0039988 A1  Feb. 14, 2008

(51) Int. Cl.
G08B 21/00 (2006.01)
(52) U.S. Cl. .......................................... 701/3; 340/945
(58) Field of Classification Search .................. 701/3, 4, 701/9, 11, 16; 244/75.1, 76 R, 183, 189, 244/190; 340/945, 963
See application file for complete search history.

(56) References Cited

U.S. PATENT DOCUMENTS

| | | | |
|---|---|---|---|
| 4,924,401 A | 5/1990 | Bice et al. | |
| 5,629,848 A | 5/1997 | Repperger et al. | |
| 6,641,087 B1 * | 11/2003 | Nelson | 244/118.5 |
| 6,739,556 B1 | 5/2004 | Langston | |
| 2004/0027256 A1 * | 2/2004 | Lane | 340/945 |
| 2004/0245409 A1 * | 12/2004 | Cordina et al. | 244/185 |
| 2005/0197137 A1 * | 9/2005 | Radic et al. | 455/456.1 |
| 2005/0216138 A1 * | 9/2005 | Turung | 701/3 |
| 2006/0173588 A1 * | 8/2006 | Joy | 701/3 |
| 2006/0184253 A1 * | 8/2006 | Andrews et al. | 700/17 |

OTHER PUBLICATIONS

E.S.P. CheckMate, Jan. 5, 2006, www.checkmateaviation.com/Products/E_S_P_/e_s_p_.html.*
Printout from http://www.checkmateaviation.com/, 2 pages, printed Jul. 17, 2006.

* cited by examiner

Primary Examiner — Khoi Tran
Assistant Examiner — Spencer Patton
(74) Attorney, Agent, or Firm — Samuel M. Korte

(57) ABSTRACT

An assisted flight computer program and method which assist a non-pilot or partially incapacitated pilot to gain control of an aircraft, summon help, and then land the aircraft under the guidance of a tower controller. The assisted flight computer program is integrated into an avionics system and provides a guided, menu-driven user interface that is simple enough for non-pilots and partially incapacitated pilots to understand and follow in distress situations.

11 Claims, 1 Drawing Sheet

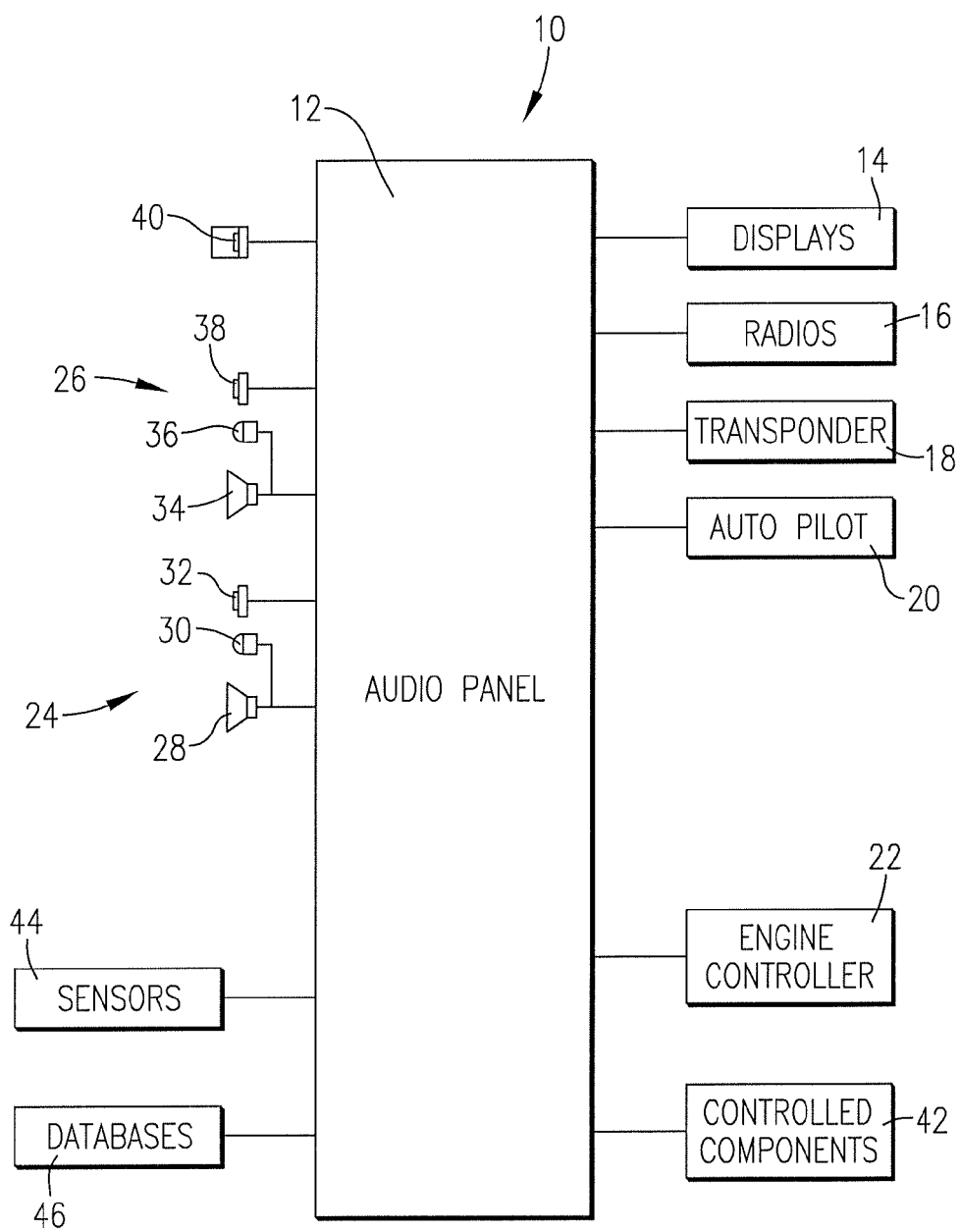

ASSISTED FLIGHT COMPUTER PROGRAM AND METHOD

FIELD OF THE INVENTION

The present invention relates to avionics systems. More particularly, the invention relates to an assisted flight computer program and method which assist a non-pilot or partially incapacitated pilot to gain control of an aircraft, summon help, and then land the aircraft under the guidance of a ground controller.

BACKGROUND

Unlike large commercial aircraft, relatively small general aviation aircraft are typically flown by a single pilot. If that pilot becomes incapacitated or partially incapacitated due to a health condition such as a heart attack, stroke, etc., non-pilot passengers on the aircraft must take control and attempt to safely land the aircraft. In these situations, a tower controller or other person on the ground can attempt to "talk down" the aircraft by coaching the passenger. However, because most aircraft include a myriad of controls, radios, and displays, they are nearly impossible to fly by a non-pilot passenger, especially when the passenger must also deal with other sources of stress, such as the incapacitated pilot who may be a relative or friend.

Control systems have been developed to control aircraft when the aircraft's pilots are incapacitated or otherwise not in control of the aircraft. These systems are primarily designed for hijacking situations and rely on specialized communication and control equipment, both in the aircraft and on the ground, to permit a tower controller or other person on the ground to take control and land the aircraft with no assistance from persons on the aircraft. These systems are therefore designed primarily for large passenger aircraft and are too expensive and complicated for use with smaller general aviation aircraft. Furthermore, many of these systems are not designed to aid someone onboard the aircraft and may actually prevent or limit control by someone onboard the aircraft.

SUMMARY OF THE INVENTION

The present invention solves the above-described problems and provides a distinct advance in the art of avionics systems. More particularly, the present invention provides an assisted flight computer program and method which assist a non-pilot or partially incapacitated pilot to gain control of an aircraft, summon help, and then land the aircraft under the guidance of a tower controller or other person on the ground. The invention provides a guided, menu-driven user interface that is simple enough for non-pilots and partially incapacitated pilots to understand and follow in distress situations.

The present invention is preferably implemented with an assisted flight computer program which is integrated into an avionics system such as the G1000 integrated avionics system provided by Garmin International, Inc. The assisted flight program may be incorporated into an audio panel or other component of the G1000 integrated avionics system or any other avionics system. Alternatively, the assisted flight program may be implemented in a stand-alone piece of avionics equipment which interfaces with an avionics system such as the Garmin G1000.

In one embodiment, the avionics system in which the assisted flight computer program is incorporated may include, among other components, an audio panel, one or more displays, one or more radios, a transponder, an autopilot system, and an engine controller such as a full authority digital engine control (FADEC). The audio panel or other component of the avionics system includes at least one computing device such as a microprocessor, microcontroller, or similar device which at least partially implements the functions of the assisted flight program.

The avionics system also preferably includes a dedicated switch, button, or other input device coupled with the audio panel for triggering the assisted flight computer program. The dedicated input device is preferably positioned in a highly visible portion of the aircraft and is marked with "Emergency", "Incapacitated Pilot", or a similar identifier. The dedicated input device may be equipped with a button guard or other safety device to prevent unintentional activation.

The assisted flight functions of the avionics system are triggered when a passenger or partially incapacitated pilot activates the dedicated input device. Upon activation, the assisted flight computer program may first engage the autopilot, if it has not already been engaged, to gain control of the aircraft. Using the autopilot, the avionics system immediately puts the aircraft into straight and level flight. If the aircraft is below the minimum safe altitude (MSA) for the sector in which the airplane is flying, the avionics system may direct the autopilot to climb to the MSA if the aircraft is capable of doing so in a reasonable amount of time. The avionics system and autopilot may also direct the aircraft to enter a spiraling climb if conflicting terrain is detected or noted within a predetermined distance of the aircraft on the aircraft's marginal or worst case rate of climb characteristics.

While the aircraft's flight is being stabilized, the avionics system changes the transponder squawk code to 7700 (emergency). This alerts all nearby tower controllers of the emergency situation within the aircraft.

Once the aircraft's flight has been stabilized, the avionics system tunes one of the aircraft's radios to an emergency frequency and prompts the passenger or partially incapacitated pilot to read a script over the radio. The script preferably incorporates the word "mayday" or "emergency" and information relating to the identity, type, position, speed, altitude, and course of the aircraft. The script may be provided to the passenger or incapacitated pilot by way of one of the displays or through one of the speakers and a text-to-speech (TTS) program. Alternatively, the TTS program may be used to communicate over the radio directly, without requiring action by the passenger or incapacitated pilot, or at the direction of the passenger or incapacitated pilot. For example, the TTS program may ask permission to transmit a mayday, and then the TTS program may actually transmit the mayday over the radio after receiving permission from the passenger or incapacitated pilot.

The avionics system then prompts the passenger or incapacitated pilot to change the destination of the aircraft or automatically changes the destination of the aircraft without user intervention. The avionics system preferably displays a scrolling list of nearby airports and permits the passenger or incapacitated pilot to select one of the airports. The airports are preferably ordered based on selected characteristics such as their distance from the aircraft, runway length, available approaches (higher precision approaches may be given priority), the amount of fuel remaining in the aircraft, the aircraft's altitude, weather conditions, surrounding terrain, and performance characteristics of the aircraft (the length of runway needed by the aircraft, the aircraft's climb characteristics, etc.).

The avionics system may also display critical flight information so the passenger doesn't have to interpret instruments when relaying aircraft status information to the ground controller. The avionics system may also call-out such information with the TTS program and an automatic speech recognition (ASR) program. For example, rather than requiring the passenger or partially incapacitated pilot to determine the closest airport from the list described above, the passenger or partially incapacitated pilot could simply say something like, "Find nearest airport". The ASR program would recognize the command and trigger a command interpreter to find the closest airport based on sensed information such as the current position, heading, and altitude of the aircraft. The avionics system may be used in a similar manner to quickly and easily provide other information such as the position, heading, altitude, and speed of the aircraft as well as weather conditions currently experienced by the aircraft or weather conditions at a selected destination of the aircraft.

Once the passenger or partially incapacitated pilot has established radio communication with a tower controller or other person on the ground, the person on the ground may instruct the passenger or partially incapacitated pilot to prepare the aircraft for landing by changing the aircraft altitude, airspeed, and heading. The ground person may also instruct the passenger or partially incapacitated pilot to disconnect the autopilot system and/or activate an instrument approach feature. Whenever possible, some or all of these functions may also be automatically performed by the avionics system, the autopilot, and/or the FADEC.

To assist the passenger or partially incapacitated pilot in flying and preparing the aircraft for landing, the avionics system may display a representation of a device to be controlled along with the control instructions. For example, the avionics system may display a drawing or photo of a throttle control along with instructions on how to operate the control so that the passenger or partially incapacitated pilot can find the control and follow the instructions.

The avionics system also monitors certain aircraft sensors and gauges to ensure that the aircraft is within safe operating parameters. For example, the avionics system may monitor the aircraft's airspeed to warn of and avoid a stall. If the airspeed drops toward a stall speed, the avionics system and FADEC may increase the aircraft's speed by adjusting the engine and/or lowering the aircraft nose.

When the aircraft is in position for final approach, the avionics system or the ground person may instruct the passenger or partially incapacitated pilot to deactivate the autopilot. This allows the passenger to reduce power and slow the aircraft to near stall speed during an attempted flare. Again, some or all of these functions may be automatically performed by the avionics system and FADEC.

The avionics system may also override certain inputs. For example, in aircraft with fly-by-wire systems, the avionics system may ignore signals from the pilot's stick when the pilot is unconscious and leaning on the stick.

To prevent potentially dangerous distraction to a functioning pilot, the avionics system may include safeguards to prevent accidental or impulsive activation of the flight assist functions. In addition to the button guard mentioned above, the system may initiate a countdown after the system has been triggered. During the countdown, the avionics system may stabilize the aircraft but not change the transponder code and/or initiate other assisted flight features. The assisted flight functions may also be deactivated at any time by the pilot by pressing a button on a primary flight display. Similarly, to avoid unintended activation of the assisted flight features during takeoff or landing, the avionics system may be programmed so that the assisted flight functions cannot be initiated while the aircraft is within a certain distance above ground level.

These and other important aspects of the present invention are described more fully in the detailed description below.

BRIEF DESCRIPTION OF THE DRAWING FIGURES

A preferred embodiment of the present invention is described in detail below with reference to the attached schematic diagram of selected components of an avionics system in which the system of the present invention may be incorporated.

The drawing FIGURE does not limit the present invention to the specific embodiments disclosed and described herein. The drawing is not necessarily to scale, emphasis instead being placed upon clearly illustrating the principles of the invention.

DETAILED DESCRIPTION OF THE PREFERRED EMBODIMENTS

The following detailed description of the invention references the accompanying drawing FIGURE that illustrates specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

The present invention can be implemented in hardware, software, firmware, or a combination thereof. In a preferred embodiment, however, the invention is implemented with an assisted flight computer program integrated into an avionics system such as the G1000 integrated avionics system provided by Garmin International, Inc. Certain components of an exemplary avionics system are broadly referred to by the numeral 10 in the drawing FIGURE. The avionics system 10 and computer programs illustrated and described herein are merely examples of computer equipment and programs that may be used to implement the present invention and may be replaced with other avionics equipment and computer programs without departing from the scope of the present invention.

Referring again to the drawing FIGURE, the avionics system 10 in which the assisted flight computer program is incorporated may include, among other components, an audio panel 12, one or more displays 14, and one or more radios 16, a transponder 18, an autopilot system 20, and an engine controller 22 such as a full authority digital engine control (FADEC). The audio panel 12 or other component of the avionics system includes at least one computing device such as a microprocessor, microcontroller, or similar device which at least partially implements the functions of the assisted flight program.

It should be noted that the features of the present invention may be incorporated into other components of the avionics system 10. For example, the features could be implemented in the G1000 itself, a separate autopilot controller, and/or some other avionics suite component. The features of the present invention may also be distributed among the components of the avionics system 10. Finally, the features of the present invention may be implemented in a stand-alone device, which is then interfaced to a more traditional avionics suite. Thus, while certain features are described as residing in the audio panel 12, the invention is not so limited, and those features may be implemented elsewhere.

The audio panel 12 may serve several stations within an aircraft. For example, the audio panel may have inputs and outputs for a pilot's station referred to by the numeral 24 and a co-pilot's or passenger's station referred to by the numeral 26. The particular stations illustrated and described herein are examples only; any number of stations may be served by the audio panel.

The pilot's station 24 may include a speaker 28, a microphone 30, and a push-to-talk (PTT) switch 32. Similarly, the co-pilot's station 26 may include a speaker 34, a microphone 36, and a push-to-talk (PTT) switch 38. The speakers 28, 34 and microphones 30, 36 are conventional and are preferably combined in aviation headsets. A separate speaker and microphone may be positioned somewhere between the stations 24, 26 to permit the pilot, co-pilot, and/or passengers to receive and transmit radio communications without their headsets.

The displays 14 are preferably large-format LCD displays. The radios 16 are preferably dual integrated radio modules that provide IFR oceanic-approved GPS, VHF navigation with ILS, and VHF communication with transceivers and 8.33 kHz channel spacing.

The transponder 18 is a conventional receiver-transmitter that responds to signals from an Air Traffic Control Radar Beacon System. The transponder 18 encodes information into its response signal such as the aircraft's identification number, the aircraft's altitude, and critical status information. The transponder can be set to one of many identifying codes. Setting the transponder 18 to broadcast a code of 1200 indicates that the flight is being conducted under visual flight rules. An air traffic controller may direct the pilot to transmit other codes to aid in identification. Certain transponder codes are reserved for special purposes. For example, the pilot can set the transponder to broadcast code 7600, indicating to the air traffic controller that the aircraft's communications radios have failed. Code 7700 indicates an emergency, and code 7500 indicates a hijacking. The transponder 18 may be replaced or supplemented with an Automatic Dependent Surveillance-Broadcast (ADS-B) system which broadcasts the aircraft position, velocity, status, etc. on a regular basis to a ground station.

The autopilot system 20 is also conventional and automates certain aspects of the aircraft. The autopilot can at least temporarily control the aircraft without pilot intervention. The autopilot system 20 may be a stand-alone system or may be incorporated into the avionics system 10.

The engine controller 22 automatically controls and adjusts certain aspects of the aircraft's engines such as the fuel-air mixture, ignition timing, rpm, etc. The engine controller 22 may be a Full Authority Digital Engine Control (FADEC) system consisting of a digital computer and related accessories and operable to control most or all aspects of the aircraft's engines, including engine speed and thrust reversers.

In accordance with one aspect of the present invention, the avionics system 10 includes or is coupled with a dedicated switch, button, or other input device 40 for triggering the assisted flight computer program. The dedicated switch is preferably positioned in a highly visible portion of the aircraft and is marked with "Emergency", "Incapacitated Pilot", or a similar identifier. The dedicated switch may be equipped with a button guard or other safety device to prevent unintentional activation.

The audio panel 12 may also be coupled with relays, controllers, and/or other equipment to control certain aircraft components broadly referred to by the numeral 42. In addition to controlling the displays 14, radios 16, transponder 18, autopilot 20, and engine controller 22, the avionics system 10 may be used to set a heading of the aircraft; set an altitude of the aircraft; set a holding pattern of the aircraft; alert an Expect Further Clearance instruction; set an approach of the aircraft; set an air speed of the aircraft; set or change a flight plan for the aircraft; draw a VFR approach for the aircraft; set a barometric pressure correction setting of the aircraft; change a navigation setting of the aircraft; and control the lowering and raising of the aircraft's landing gear. These are only examples of aircraft components which may be controlled by the system of the present invention.

The audio panel 12 may also be directly or indirectly coupled with sensors 44 or other devices which sense the state of certain aspects of the aircraft. For example, and as described in more detail below, the avionics system 10 may receive inputs from a GPS receiver which determines a location or position of the aircraft. The sensors may also indicate a heading of the aircraft, an altitude of the aircraft, a speed of the aircraft, a flight plan for the aircraft, fuel level, a wind speed experienced by the aircraft, a wind direction experienced by the aircraft, a temperature experienced by the aircraft, and a weather condition currently experienced or to be experienced by the aircraft.

The audio panel 12 may also have access to one or more databases broadly referred to by the numeral 46. The databases 46 may include, for example, the ATIS, clearance, ground and tower frequencies for all known airports; stored waypoints and other navigation information; pre-flight, pre-landing, and pre-taxi checklists and other checklists; stored flight plans; general information about the aircraft and airports used by the aircraft; topographic data; obstacle locations and heights; terrain elevation data; airplane configuration settings; pilot profiles; arrival procedures; departure procedures; approach procedures; airport diagrams; runway and taxiway data; weather frequencies; user defined waypoints; VORs; NDBs; and intersections, airways, and airspace boundaries.

The audio panel 12 or other component of the avionics system 10 may also store an automatic speech recognition (ASR) program and a text-to-speech (TTS) program. The ASR program can be any conventional speech recognition software such as the VoCon 3200 provided by Nuance. Likewise, the TTS program can be any conventional text-to-speech software such as the Real Speech Solo program provided by Nuance.

The assisted flight computer program and ASR and TTS computer programs each preferably comprise an ordered listing of executable instructions for implementing logical functions in components of the avionics system 10. The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electromagnetic, infrared, or semi-conductor system, apparatus, device, or propagation medium. More specific, although not exclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The ASR program is preferably coupled with a grammar definition which stores known commands and requests such as "Help", "Emergency", etc. The ASR program accesses the grammar definition in order to recognize spoken words or phrases. The ASR program is also coupled with a voice command interpreter. The voice command interpreter may determine the appropriate action to take based on the words and phrases detected by the ASR program, the state of the aircraft as sensed by the sensors 44, and/or information in the aviation databases 46. The voice command interpreter also causes the TTS program to speak words or phrases and controls the display of information on the displays 14. The voice command interpreter can also dynamically change the known commands in the grammar definition.

Operation

The avionics system 10 described and illustrated herein may be used when a pilot of an aircraft becomes incapacitated or partially incapacitated because of a health problem or other problem. The system assists a non-pilot passenger, or a partially incapacitated pilot, in gaining control of the aircraft, summoning help, and then landing the aircraft under guidance from a tower controller or other person on the ground.

The assisted flight functions are triggered when a passenger or partially incapacitated pilot activates the dedicated input device 40. Upon activation, the assisted flight computer program may first engage the autopilot 20, if it hasn't already been engaged, to gain control of the aircraft. Using the autopilot 20, the avionics system 10 immediately puts the aircraft into straight and level flight. If the aircraft is below the minimum safe altitude (MSA) for the sector in which the airplane is flying, the avionics system 10 directs the autopilot 20 to climb to the MSA. The avionics system 10 and autopilot 20 may also direct the aircraft to enter a spiraling climb if conflicting terrain is detected or noted within a predetermined distance of the aircraft considering the aircraft's marginal or worst case rate of climb characteristics. Some autopilot systems will not engage if the aircraft is pitched or banked beyond certain limits. The avionics system may be programmed to ignore and/or expand these limits so that the autopilot can be engaged in emergency situations regardless of the bank or pitch of the aircraft.

The computer program may also consider a set of "rules" to determine whether to engage the autopilot 20. For example, if a sensor determines that the aircraft is damaged, or the weather is bad, or the aircraft's attitude and/or altitude is out of prescribed boundaries, the autopilot 20 may not be engaged. Similarly, the computer program may determine whether the aircraft is able to attain MSA. That altitude may be outside the aircraft's performance envelope entirely, may be difficult to reach due to temperature and loading, or may be impractical because the aircraft may take an unreasonably long period of time to attain MSA. In situations where the aircraft cannot reach the MSA in a reasonable amount of time, the computer program may instruct the aircraft to climb as high as possible in a circling pattern in order to provide time to further assess the situation.

The computer program may also have a "rule" that declines activation of the autopilot if more than a certain percent of surrounding terrain within a certain distance of the aircraft is at or above current altitude. This would be necessary for an algorithm to determine a safe circling pattern—one that allows for higher winds to blow the aircraft far outside a perfect circle if not corrected for. If a safe circling pattern cannot be executed, the computer program may not engage the autopilot.

Either before or after the aircraft's flight has been stabilized, the avionics system 10 changes the transponder 18 squawk code to 7700 (emergency) and/or configures the ADS-B to indicate an emergency. This alerts all nearby tower controllers of the emergency situation within the aircraft. The avionics system also tunes one of the radios 16 to 121.5, or any other emergency frequency, and then prompts the passenger or partially incapacitated pilot to read a script over the radio. The script preferably incorporates the word "mayday" or "emergency" and information relating to the identity, type, position, speed, altitude, and course of the aircraft. The script may be provided to the passenger or incapacitated pilot by way of one of the displays 14 or through one of the speakers 28, 34 and the TTS program. Alternately, a pre-recorded emergency message could be automatically transmitted upon activation of the assisted flight computer program.

Alternatively, the ASR and TTS programs may be used to communicate over the radio directly, without requiring action by the passenger or incapacitated pilot, thereby reducing their workload in this stressful situation. For example, when the avionics system determines that it is appropriate to communicate with the ground, such as sending a mayday, the system may automatically do so. More specifically, since the avionics system knows or has access to virtually every aircraft state information, such as position, airspeed, altitude, etc., the system may simply listen for a opening and automatically transmit the mayday including relevant aircraft identification and state. Alternatively, the ASR and TTS programs may be used to communicate over the radio at the direction of the passenger or incapacitated pilot. For example, the TTS program may ask permission to transmit a mayday, and then the TTS program may actually transmit the mayday over the radio after receiving permission from the passenger or incapacitated pilot through the ASR program.

The avionics system then prompts the passenger or incapacitated pilot to change the destination of the aircraft. The avionics system preferably displays a scrolling list of nearby airports from the databases 46 and permits the passenger or incapacitated pilot to select one of the airports with a soft key on the avionics system or another input device. The airports are preferably ordered based on selected characteristics such as their distance from the aircraft, runway length (longer runways may be given priority), available approaches (higher precision approaches may be given priority), the amount of fuel remaining in the aircraft, the aircraft's altitude, weather conditions, surrounding terrain, and performance characteristics of the aircraft (the length of runway needed by the aircraft, the aircraft's climb characteristics, etc.). Alternatively, the avionics system may automatically change the destination of the aircraft to a nearby airport without user intervention.

After the aircraft has been stabilized, the avionics system 10 may display critical flight information on one of the displays so the passenger or partially incapacitated pilot doesn't have to interpret instruments when relaying aircraft status information to a tower controller. The information is displayed in a simplified fashion to aid understanding. For example, the avionics system may simply display "Altitude XXX feet" in a simple and conspicuous manner so the passenger doesn't have to interpret the information. The avionics system may also display such limited information independently, without any other information on the display, so the passenger doesn't have to search for the information. Specifically, the avionics system may use one or more of the displays 14 to display simple textual readouts of important status information, rather than the more complex graphics normally displayed.

The avionics system may also call-out critical flight information with the TTS program. For example, rather than requiring the passenger or partially incapacitated pilot to determine the closest airport from the list described above, the passenger or partially incapacitated pilot could simply say something like, "Find nearest airport". The ASR program would then recognize the command and trigger the command interpreter to find the closest airport based on sensed information such as the current position, heading, and altitude of the aircraft. The command interpreter then displays the name and coordinates of the closest airport on the display or provides this information audibly with the TTS and one of the speakers 28, 34. The system may be used in a similar manner to quickly and easily provide other information such as the position, heading, altitude, and speed of the aircraft as well as weather conditions currently experienced by the aircraft or weather conditions at a selected destination of the aircraft. The system may also be used to automatically provide a call-out when a sensed condition changes. For example, the command interpreter and TTS may call-out an alert when the aircraft descends below a selected threshold altitude, when the aircraft slows below a selected threshold airspeed, or when weather conditions change as sensed by one of the sensors. Other TTS alerts and warnings that may be provided by the avionics system include engine fire or other failure warnings and restricted or prohibited airspace warnings.

Once the passenger or partially incapacitated pilot has established radio communication with a tower controller or other person on the ground, the person on the ground may instruct the passenger or partially incapacitated pilot to prepare the aircraft for landing by changing the aircraft altitude, airspeed, and heading. Whenever possible, some or all of these functions may also be automatically performed by the avionics system, the autopilot, and/or the engine controller 22.

To assist the passenger or partially incapacitated pilot in preparing the aircraft for landing, the avionics system 10 may display a representation of a device to be controlled along with the control instructions. For example, the avionics system 10 may display a drawing or photo of a throttle control along with instructions on how to operate the control so that the passenger or partially incapacitated pilot can find the control and follow the instructions. In this manner, the avionics system may display a drawing or photo of virtually any aircraft control along with instructions on how to operate those controls, such as a mixture control, a landing gear lever, a flaps lever, an aileron control or trim, an elevator control or trim, and/or a rudder control or trim.

The avionics system 10 also monitors the sensors 44 to ensure that the aircraft is within safe operating parameters. For example, the avionics system 10 may monitor the aircraft's airspeed to warn of and avoid a stall. If the airspeed drops toward a stall speed, the avionics system 10 and engine controller 22 may increase the aircraft's speed by adjusting the engine and/or lowering the aircraft nose or may instruct the passenger or partially incapacitated pilot to take these steps.

When the aircraft is in position for final approach, the avionics system 10 or the ground controller may instruct the passenger or partially incapacitated pilot to deactivate the autopilot 20. This allows the passenger to reduce power and slow the aircraft to near stall speed during an attempted flare. Alternately, the avionics system or ground controller may instruct the passenger or partially incapacitated pilot to activate an instrument approach. Again, some or all of these functions may be automatically performed by the avionics system 10 and/or the engine controller 22.

The avionics system 10 may also override certain inputs. For example, the avionics system 10 may ignore signals from the pilot's stick when the pilot is unconscious and leaning on it. The avionics system may also deactivate one or more of the radios 16 and/or displays 14 so the passenger or partially incapacitated pilot is not distracted by unnecessary radio communications and/or unnecessary displays.

To prevent potentially dangerous distractions to a functioning pilot, the avionics system 10 may include safeguards to prevent accidental or impulsive activation of the assisted flight computer program. In addition to the button guard mentioned above, the avionics system may initiate a countdown after the dedicated input device 40 has been triggered. During the countdown, the avionics system 10 may stabilize the aircraft but not change the transponder code and/or initiate other functions of the assisted flight computer program. The assisted flight features of the avionics system may also be deactivated at any time by the pilot by pressing a button on the primary flight display or elsewhere in the aircraft. Similarly, to avoid unintended activation of the assisted flight features during takeoff or landing, the avionics system 10 may be programmed so that the assisted flight functions cannot be initiated while the aircraft is within a certain distance above ground level.

When automatically controlling functions of the aircraft or when providing information to the passenger, the avionics system 10 may consider information about the state of the aircraft gained from the sensors 44 and/or information stored in the databases 46. The information about the state of the aircraft may include, but is not limited to, any of the following: a position of the aircraft; a heading of the aircraft; an altitude of the aircraft; a speed of the aircraft; a flight plan for the aircraft; aircraft fuel level; wind speed; wind direction; temperature; a weather condition currently experienced or to be experienced by the aircraft; a phase of flight of the aircraft; a track of the aircraft; a desired track of the aircraft; an altitude pre-select; a height above terrain or obstacles; a position of other aircraft; an auto pilot setting; a trim setting; a flaps setting; a landing gear state; an engine setting; a manifold pressure; an oil temperature; an oil pressure; an exhaust gas temperature; a cylinder head temperature; a state of an electrical system; a vacuum system state; an environmental control system state or setting; an anti-icing setting; a V-speed setting; pitch angle; roll angle; aircraft heading; pitch attitude rate; roll attitude rate; yaw body rate; lateral acceleration; vertical acceleration; pressure altitude; barometric correction; indicated airspeed; true airspeed; Mach number; selected altitude; selected heading; selected course; VOR angular deviation; cross-track distance; localizer deviation; glideslope deviation; CDI (course deviation indicator) scale; GPS roll steering; runway length; distance to VOR or localizer transmitter; glide path angle; VOR or localizer transmitter elevation; wind direction; wind speed; track angle; ground speed; bearing to waypoint; vertical speed; VOR bearing to station; lateral acceleration; vertical path deviation; glide path deviation; desired track; as well as that information calculated from this information.

Although the invention has been described with reference to the preferred embodiment illustrated in the attached drawing FIGURE, it is noted that equivalents may be employed and substitutions made herein without departing from the scope of the invention as recited in the claims.

Having thus described the preferred embodiment of the invention, what is claimed as new and desired to be protected by Letters Patent includes the following:

1. An avionics system for an aircraft, the avionics system comprising:
    an input for receiving an initiation signal from a dedicated emergency input device;
    an autopilot for automatically controlling certain aspects of the aircraft;
    a transmitter for sending transmissions from the aircraft;
    an assisted flight program, responsive to the initiation signal from the dedicated emergency input device, and configured to—
        engage the autopilot to stabilize flight of the aircraft,
        alert a ground controller, through the transmitter, that the aircraft is in an emergency situation, and
        assist a passenger of the aircraft in controlling the aircraft, and
    a display configured to present conventional flight information and replace the conventional flight information with simplified flight information upon reception of the initiation signal.

2. The avionics system of claim 1, wherein the assisted flight program is further operable to automatically control a function of the aircraft to prepare the aircraft for landing.

3. The avionics system of claim 2, wherein the automatically controlling a function step is selected from the group consisting of: changing a frequency of a radio on the aircraft; setting a heading of the aircraft; setting an altitude of the aircraft; setting a holding pattern of the aircraft; configuring an auto pilot of the aircraft; performing a pre-landing checklist; setting an approach of the aircraft; setting an air speed of the aircraft; setting or changing a flight plan for the aircraft; drawing a visual flight rules (VFR) approach of the aircraft; setting a barometric pressure correction setting of the aircraft; changing a navigation setting of the aircraft; setting a transponder code; and setting a descent or climb rate.

4. The avionics system as set forth in claim 1, wherein the avionics system alerts the ground controller by changing a transponder setting of the aircraft to an emergency code.

5. The avionics system as set forth in claim 1, wherein the avionics system alerts the ground controller by changing a radio on the aircraft to an emergency frequency and then prompting the passenger to transmit an emergency message to the ground controller.

6. The avionics system as set forth in claim 5, wherein the prompting step includes the step of displaying the emergency message on the display in the aircraft and prompting the passenger to read the emergency message over the radio.

7. The avionics system as set forth in claim 5, further including a speaker operable to generate sound, wherein the assisted flight program is further operable to execute a text-to-speech (TTS) program to audibly present the prompts to the passenger using the speaker.

8. The avionics system as set forth in claim 1, wherein the assisted flight program is further operable to determine a suitable airport at which to land the aircraft and then prompt the passenger to direct the aircraft to the airport.

9. The avionics system as set forth in claim 8, wherein the assisted flight program takes into account a factor selected from the group consisting of a distance between the aircraft and the airport; approaches available at the airport; fuel remaining in the aircraft; altitude of the aircraft; weather; terrain near the aircraft; terrain near the airport; and performance characteristics of the aircraft when determining the suitable airport.

10. The avionics system as set forth in claim 1, wherein the display is operable to present a visual representation of a device to be controlled by the passenger along with control instructions to assist the passenger in controlling the aircraft.

11. The avionics system as set forth in claim 1, further including a microphone operable to receive an audible command from the passenger, wherein the assisted flight program is further operable to execute an automatic speech recognition (ASR) program to recognize the audible command from the passenger and automatically perform an associated task.

* * * * *